United States Patent [19]

Hach et al.

[11] 4,177,148
[45] Dec. 4, 1979

[54] MECHANICAL STRAINER

[75] Inventors: Clifford C. Hach, Ames, Iowa; Wayne P. Zemke, Port Washington, Wis.

[73] Assignee: Hach Chemical Company, Loveland, Colo.

[21] Appl. No.: 883,205

[22] Filed: Mar. 3, 1978

[51] Int. Cl.² ............................................. B01D 33/00
[52] U.S. Cl. .................................. 210/396; 210/488; 210/492
[58] Field of Search ............... 210/152, 488, 498, 396, 210/397, 322, 407, 413, 414, 415, 352, 492, 172; 23/230 R; 55/278, 400

[56] References Cited

U.S. PATENT DOCUMENTS

| | | | |
|---|---|---|---|
| 2,227,344 | 12/1940 | Hartmann | 210/492 X |
| 2,289,539 | 7/1942 | Cuno | 210/397 |
| 2,365,525 | 12/1944 | Cox | 210/415 |
| 2,440,384 | 4/1948 | Schentre | 210/415 X |
| 2,459,376 | 1/1949 | Hallinon | 210/352 X |
| 2,855,106 | 10/1958 | English | 210/492 |
| 2,873,030 | 2/1959 | Ashton | 210/488 |
| 3,006,478 | 10/1961 | Mueller | 210/488 |
| 3,048,276 | 8/1962 | Darnell | 210/488 |
| 3,052,359 | 9/1962 | Rounds | 210/407 |
| 3,286,843 | 11/1966 | Kraissl, Jr. | 210/396 X |
| 3,615,020 | 10/1971 | Olgarn | 210/322 |
| 3,840,119 | 10/1974 | Weirich et al. | 210/396 |
| 4,036,759 | 7/1977 | Donovan | 210/413 |
| 4,053,282 | 10/1977 | Hach et al. | 23/230 R |

*Primary Examiner*—Theodore A. Granger
*Attorney, Agent, or Firm*—Leydig, Voit, Osann, Mayer & Holt, Ltd.

[57] ABSTRACT

A mechanical strainer having a stack of alternate discs and blades biased together, the discs being slowly driven by a motor and the blades being anchored on the strainer frame, which discs and blades are perforated so that water surrounding the strainer can leak into the perforations of the stack. A passage is formed in the frame communicating with the perforations of the stack, and a tube leading to where the water is desired is coupled to the frame passage. The result is a kind of labyrinth rotary seal having intended leakage.

1 Claim, 5 Drawing Figures

MECHANICAL STRAINER

This invention relates generally to mechanical strainers intended to separate a flow of liquid from foreign particulate matter in the liquid body, and more particularly concerns a strainer for drawing a liquid sample stream that is free of foreign solids.

A method and apparatus for sampling impure water is disclosed in U.S. Pat. No. 4,053,282, issued Oct. 11, 1977, which includes drawing a continuous sample stream of water through a small diameter tube from the liquid body being monitored. When the liquid body is raw sewage, impure river water, etc., it can be expected that substantial amounts of solid foreign matter such as sand, mud, sewage, paper, vegetable matter, etc. will be encountered, and must be filtered or strained out to avoid clogging the initial sample drawing tube and/or the analyzer itself.

The use of a filter as opposed to a strainer to protect an analyzer intake does not really achieve continuous monitoring analysis. Using a filter is more like drawing one large sample through the filter whose particulate character changes as the filter fills up and which soon comes to an end when the filter eventually clogs. Another obvious disadvantage of filters for this use is that they must be frequently replaced, particularly when encountering heavily polluted water.

Accordingly, it is the primary aim of the invention to provide a mechanical strainer for the application discussed above that takes out particulate matter down to fine grains, and which functions for long periods of time even in heavily polluted water.

Another object is to provide a strainer as characterized above that functions with a very low pressure drop, having large straining regions or areas, so as to be well suited for use with water analyzers.

A further object is to provide a strainer of the above type which is to a great extent mechanically self-cleaning but which nevertheless can be economically manufactured and operated.

Other objects and advantages of the invention will become apparent upon reading the following detailed description and upon reference to the drawings, in which.

Figure 1:
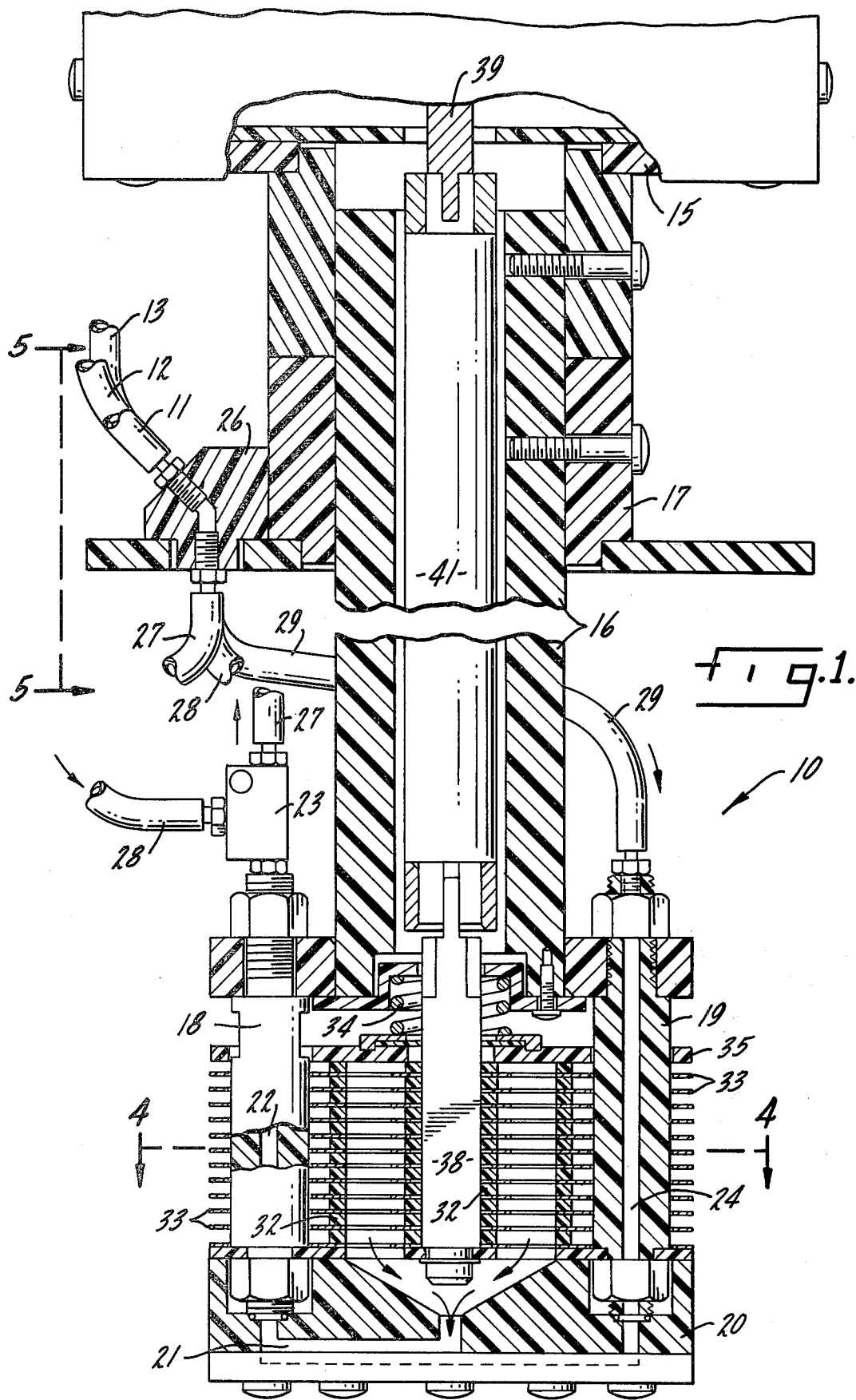
FIG. 1 is a fragmentary section taken vertically through a strainer embodying the invention.
Figure 2:
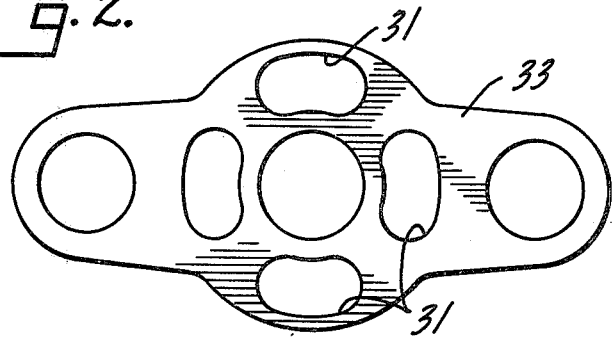
FIGS. 2 and 3 are elevations of two of the types of strainer elements used in the strainer shown in FIG. 1.
Figure 3:
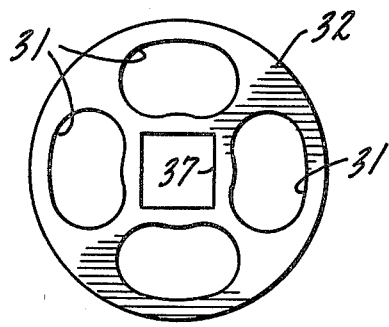
Figure 4:
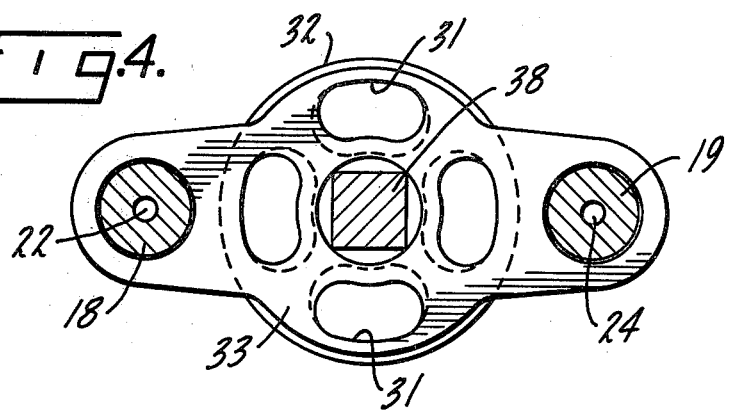
FIG. 4 is a section taken approximately along the line 4—4 in FIG. 1.
Figure 5:
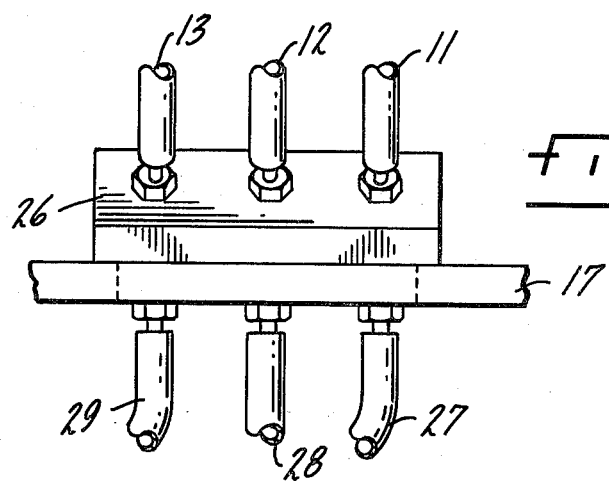
FIG. 5 is a partial elevation taken along the line 5—5 in FIG. 1.

While the invention will be described in connection with a preferred embodiment, it will be understood that we do not intend to limit the invention to that embodiment. On the contrary, we intend to cover all alternative, modifications and equivalents as may be included within the spirit and scope of the invention as defined by the appended claims.

Turning to the drawings, there is shown a mechanical strainer 10 adapted to be immersed in a body of liquid and allow the liquid to be drawn through a tube 11 while the strainer keeps out foreign particulate matter. As taught in U.S. Pat. No. 4,053,282 referred to above, a small amount of acid and a succession of air bubbles are added to the liquid sample stream in the tube 11 through acid and air lines 12 and 13, respectively.

The strainer 10 includes a frame made up of a motor housing 15 secured to a central tube 16 that carries a bracket collar 17 and a pair of posts 18 and 19 that support an end plate 20. The end plate 20 is formed with a central passage 21 communicating with a passage 22 bored in the post 18 which leads to a T-connection block 23. The second post 19 is also formed with a central bore 24 leading to the end plate passage 21.

A tube terminal block 26 is mounted on the bracket collar 17 providing fittings so that the sample tube 11 is coupled via a line 27 to the T-connection block 23, the acid line 12 is coupled via a line 28 to the side of the block 23 so as to add acid to the flowing sample, and the air line 13 is coupled via a line 29 to the post 19 so that air bubbles can be pulsed into the passage 21 and thus to the tube 11.

In accordance with the invention, the end plate passage 21 communicates with the perforations 31 in a stack of perforated discs 32 and blades 33 which are alternately stacked and resiliently pressed together by a spring 34 acting through a plate 35 floating on the posts 18, 19. The relatively thin blades 33 are slidably anchored for non-rotation on the posts 18, 19, and the thicker discs 32 have square center holes 37 fitted slidably but non-rotatably on a square shaft 38 that is rotatably driven by a motor 39 in the housing 15 through a coupling shaft 41 in the tube 16. In the preferred embodiment, the motor 39 drives the shaft 38 at a very slow 1 rpm rate. Preferably, the blades 33 are formed of stainless steel and the discs 32 are formed of a hard, smooth plastic such as polyvinylchloride.

It can now be seen that the discs 32 and blades 33 function like a labyrinth rotary seal with intended leakage of liquid moving from the periphery of the discs and blades into the center perforations 31 and then down to the end plate passage 21. Foreign particulates that cannot pass into the gaps between the discs 32 and the blades 33 are blocked and strained from the flow of liquid. The slow relative rotation of the discs and blades makes them relatively self-cleaning.

The strainer 10, with its large straining region or area, i.e., the entire cylindrical periphery of the stack of discs and blades, operates with a very low pressure drop, making it particularly suitable for use with analyzers having relatively little pump pressures. It is believed that there is some grinding action on particles between the discs 32 and the blades 33, but material that is so ground is fine enough to pass through the tube 11 and the succeeding analyzer without difficulty.

For protection purposes, the strainer can be provided with an outer shield or housing, not shown.

We claim as our invention:

1. A mechanical strainer comprising, in combination, a frame including an end plate, said frame including a pair of posts supporting said end plate, a shaft journaled for rotation in said frame, a plurality of perforated discs slidably but non-rotatably mounted on said shaft, a plurality of perforated blades sandwiched between said discs, said blades not being coupled to said shaft but slidably anchored for non-rotation on said end posts, means for urging the stack of interfitted discs and blades together and against said end plate completely enclosing the disc and blade perforations, means on said frame for slowly and continuously driving said shaft, said end plate being formed with a passage opening to the perforations in said discs and blades, and means including a passage through one of said posts that opens to said end plate passage for coupling a tube to said passage so that water leaking between said relatively rotating discs and blades finds its way to said tube while foreign particulate matter is stopped at the peripheries of the discs and blades.

* * * * *